June 14, 1949.　　　　B. E. GILMORE　　　　2,473,142
ARTIFICIAL FISH LURE
Filed Aug. 4, 1944

Inventor
BASIL E. GILMORE,
By Clarence A. O'Brien
and Harvey B. Jacobson
Attorneys Patented June 14, 1949

2,473,142

UNITED STATES PATENT OFFICE 2,473,142

ARTIFICIAL FISH LURE

Basil E. Gilmore, Windsor, Mo.

Application August 4, 1944, Serial No. 548,004

5 Claims. (Cl. 43—48)

This invention relates to a novel and improved artificial fish lure in the form of an imitation wasp or moth, preferably the latter, this due to the fact that moths floating atop the water, as does this lure, are especially attractive and alluring to certain types of fish.

Briefly and broadly, the overall structure is characterized by a hump or kink-equipped hook, this having mounted thereon a sponge-rubber body of predetermined contour, there being a plurality of dangling and wiggling feelers or legs attached to the underside of the body inward of the head.

I am aware that artificial lures possessed of the aforementioned general structural characteristics are not new. Therefore, in carrying out the aims and achievements of the instant invention I have striven to promote limited but nevertheless unique structural refinements in lures in this category. That is to say, one phase of the invention has to do with the use of a silk cord wrapping which is wound about the major part of the shank of the hook, this being held in place by an adhesive and the cord and adhesive serving to anchor the body against longitudinal, and to a limited extent, axial displacement.

An outstanding feature of the invention has to do with the embedding of the shank of the hook in the body in such a way that the entire bend or kink is exposed beneath the flat bottom of the body, this being cord-wrapped by preference, and serving as a novel ways-and-means of applying and retaining the readily agitatable latex or equivalent feelers.

A further feature of the invention has reference to an auxiliary tie or wrapping which embraces the return bend of the barbed hook, this wrapping coacting with said bend and body to serve as a further reinforcement and anti-slipping feature.

A further phase of the invention has to do with a buoyant and, therefore, floatable sponge-rubber body of appropriate shape, this having its bottom peeled off flat for sake of appearance and also to readily expose the hump or kink on the shank of the fish-hook, there being a supplemental patch secured to said flat bottom and coacting with the hump and the attached intermediate portions of the feelers, whereby to provide a novel assemblage of parts.

Other features and advantages will become more readily apparent from the following description and the accompanying illustrative drawings.

In the drawings Figures 1 to 7 are details of construction of my lure and wherein like numerals are employed to designate like parts throughout the same:

Figure 1:
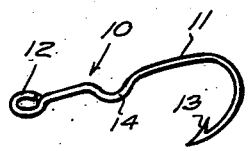
Figure 1 is a perspective view of the hump or kink-equipped fish hook.
Figure 2:
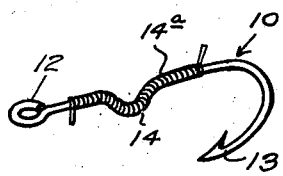
Figure 2 is a view with the silk cord or equivalent wrapping in place.

Referring now to the drawings by distinguishing reference numerals it will be seen that the somewhat conventional fish-hook is denoted by the numeral 10, this comprising a shank 11 having an eye 12 at one end and a barbed hook 13 at the opposite end, the intermediate portion of the shank being provided with a kink or hook 14. These hump-hooks are not, in themselves, new.

In accordance with the principles of this invention the shank of the hook is coated with a suitable adhesive and an appropriate silk or equivalent cord 14a is wound therearound and thus securely anchored in place. It will be noticed that the cord wrapping extends throughout the length of the hump and for distances on opposite sides of said hump, this being sufficient coverage for adequate anchorage of the flat bottom sponge-rubber body 15 thereon. This body is fashioned, as far as possible, to imitate a moth. Sponge-rubber bodies and lures of this type are also old as is the idea of using sponge-rubber for buoyancy and to permit the lure to float atop the water. It is believed, however, that the use of a plump body of this type having its body peeled off to render it flat may, perhaps, be unique.

Figure 3:
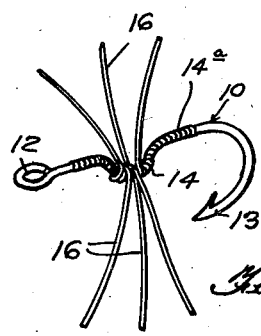
Figure 3 is a perspective view showing the next step, that is, the step in which the intermediate portions of the latex feelers are tied around the wrapped kink or hump for quick assemblage purposes.
Figure 4:
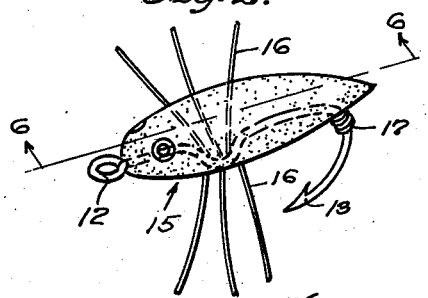
Figure 4 is a perspective view of the finished lure.

Reference being had to Figure 3, it will be seen that before the body is applied I attach a multiplicity of latex or highly flexible feelers or legs 16 in place. These are individually coiled and tied around the wrapped hump as shown and are thus securely glued in place. It is possible with this type of lure to attach the feelers after the body is applied to the shank of the hook. The important feature to be noticed in connection with this is the fact that the bend or kink 14 is exposed wholly below the flat bottom of the body thus to provide clearance and ways-and-means of attaching the feelers in place.

The coaction of the adhesive, wrapping 14a and kink 14 serves to prevent endwise or longitudinal slippage of the body on the shank and also to prevent axial turning of the body in relation to said shank. I would stress again the exposing of the hump 14 below the flat bottom as a space and ways-and-means of effectively tying the feelers in place and renewing the same when they are broken.

Figure 5:
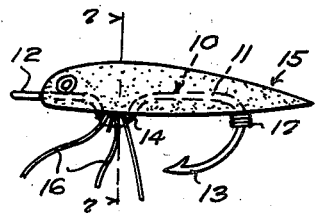
Figure 5 is a side elevational view of the same.
Figure 6:
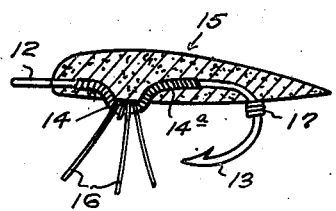
Figure 6 is a longitudinal sectional view on the line 6—6 of Figure 4, looking in the direction of the arrows.
Figure 7:
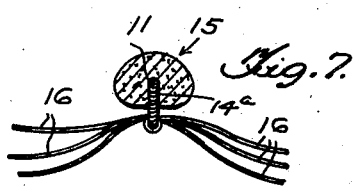
Figure 7 is a cross-section on the line 7—7 of Figure 5.
Figure 9:
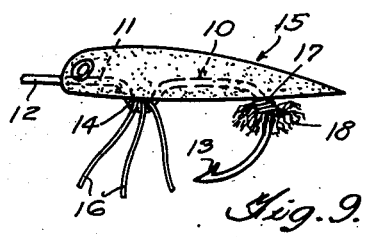
Figure 9 is a side elevation similar to Figure 5 showing the addition of a frizzle tail, sometimes used as extra feature of adornment.

Another point is the provision of the tail wrapping 17, this being attached at the return bend of the barbed hook and coacting with the adjacent flat tail surface of the body as brought out to advantage in Figures 5 and 6. This wrapping 17 also serves as a convenient means of attaching the added ornament (see Figure 9) made up of thin latex elements 18.

Figure 8:
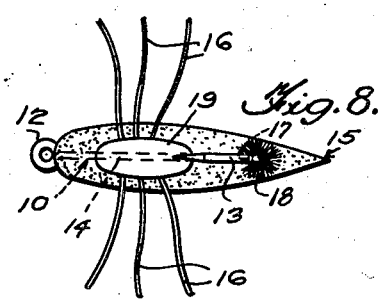
Figure 8 is a bottom plan view, of an embodiment of the invention wherein an ovate patch is added in a manner to cover the aforesaid wrapped kink or hump and which serves as a spreader for the feelers.

I also call attention to the substantially ovate patch 19 (see Figure 8) which is attached to the flat bottom and which covers the kink 14 and the adjacent attached intermediate portions of the feelers. All of these parts contribute their proportionate shares to the production of a novel and practicable lure.

It is thought that persons skilled in the art to which the invention relates will be able to obtain a clear understanding of the invention after considering the description in connection with the drawings. Therefore, a more lengthy description is regarded as unnecessary.

Minor changes in the shape, size and arrangement of details coming within the field of invention claimed may be resorted to in actual practice, if desired.

I claim:

1. As a new article of manufacture, a fishhook including a shank having an intermediate hump, and a wrapping around said shank completely covering the hump and adjacent portions of the shank on opposite sides of said hump, together with a plurality of flexible feelers coiled and tied around the wrapping and held within the crotch portion of said hump.

2. An artificial lure of the class described comprising a fish-hook including a shank having an eye at one end, a hook at the opposite end and a hump intermediate its ends, a sponge-rubber body, the shank being embedded in said body, and the crest portion of the hump being exposed and protruding completely below the body, a plurality of lateral dangling latex feelers, the intermediate portions of said feelers being tied and secured to the exposed crotch portion of the hump, and a wrapping around the return bend portion of the hook, said wrapping contacting the adjacent underside surface of the body.

3. An artificial lure of the class described comprising a fish-hook including a shank having an eye at one end, a hook at the opposite end and a hump intermediate its ends, a sponge-rubber body, the shank being embedded in said body, and the crest portion of the hump being projected completely below the body, a plurality of lateral, dangling, latex feelers, the intermediate portions of said feelers being tied and secured to the projected crotch portion of the hump, a wrapping around the return bend portion of said hook, said wrapping engaging the bottom of the body, and an adhesive patch secured to the bottom of said body and covering said hump and the adjacent, anchored, intermediate portions of said feelers.

4. An artificial lure of the class described comprising a fish hook including a shank having a hook at one end and an eye at the opposite end, the intermediate portion of said shank being laterally bent to provide a hump inturned in relation to said hook, a lure body having a substantially flat underside, said shank being embedded longitudinally in said body with the eye exposed at one end, the hook exposed at the opposite end and underlying said body, and the crest portion of said hump protruding beneath said underside and combining with the latter in forming an attaching eye for feelers, and a plurality of flexible feelers coiled and tied to said hump, the free ends of said feelers projecting beyond opposite longitudinal sides of said body.

5. A lure as described comprising a rubber body, a fishhook having a longitudinally wrapped shank embedded in and extending lengthwise and approximately from end to end through said body, said shank having a lateral bend intermediate its ends forming a hump, the latter and complemental wrappings projecting below the underside of said body, flexible feelers connected intermediate their ends to the hump and hump wrappings and projecting laterally and beyond said body, means secured to the underside of said body and connected portions of said feelers for holding the feelers spread apart, and ornamenting means attached to the hook where latter emerges from the underside of said body, the bill portion of said hook being disposed below the stated underside of the body.

BASIL E. GILMORE.

REFERENCES CITED

The following references are of record in the file of this patent:

UNITED STATES PATENTS

| Number | Name | Date |
| --- | --- | --- |
| 633,726 | Manchester | Sept. 26, 1899 |
| 633,797 | Cantrell | Sept. 26, 1899 |
| 1,518,199 | Hennings | Dec. 9, 1924 |
| 1,523,895 | Pott | June 20, 1925 |
| 1,929,150 | Peckinpaugh | Oct. 3, 1933 |
| 2,169,929 | Schumann | Aug. 15, 1939 |
| 2,187,666 | Schumann | Jan. 16, 1940 |
| 2,236,241 | Wolfe | Mar. 25, 1941 |
| 2,242,708 | Lancaster | May 20, 1941 |
| 2,250,478 | Franks | July 29, 1941 |